United States Patent [19]

Fujii et al.

[11] Patent Number: 4,957,530
[45] Date of Patent: Sep. 18, 1990

[54] APPARATUS FOR PLUNGER REPLACEMENT IN A MOLDING MACHINE WHILE THE MOLDING MACHINE IS IN OPERATION

[75] Inventors: Sigezo Fujii; Tsuneya Uesugi, both of Nagahama; Kiyoshi Sakamoto, Siga, all of Japan

[73] Assignee: Nippon Electric Glass Co., Ltd., Otsu, Japan

[21] Appl. No.: 347,644

[22] Filed: May 5, 1989

[30] Foreign Application Priority Data

May 11, 1988 [JP] Japan .................. 63-115572

[51] Int. Cl.⁵ ............................................. C03B 11/02
[52] U.S. Cl. ...................................... 65/172; 65/246; 65/308; 65/362
[58] Field of Search .................. 65/27, 171, 172, 173, 65/308, 362, 305, 246

[56] References Cited

U.S. PATENT DOCUMENTS 2,732,665  1/1956  Cassell .................. 65/246

FOREIGN PATENT DOCUMENTS 59-3024   1/1984  Japan .................. 65/246
60-137838 7/1985  Japan .

Primary Examiner—Joye L. Woodard
Attorney, Agent, or Firm—Armstrong, Nikaido, Marmelstein, Kubovcik & Murray

[57] ABSTRACT

A molding machine having a plunger replacement apparatus is disclosed. Molding operation of the molding machine for a plunger requiring replacement is only discontinued, and the plunger requiring replacement is taken out to a plunger replacing position through a reciprocating mechanism. Moving yokes are locked by locking mechanisms to fixed yokes at the pressing and plunger replacing positions. The position of the plunger is always held constant during the process of replacement at the plunger replacing position and also when the plunger is returned to the pressing position. When the plunger requiring replacement is taken out in a plunger replacing position, molding operation for the molding machine is continued by using the remaining plungers, thereby minimizing possible drop in molding operation productivity and preventing undesirable changes in temperature distribution conditions.

3 Claims, 2 Drawing Sheets

APPARATUS FOR PLUNGER REPLACEMENT IN A MOLDING MACHINE WHILE THE MOLDING MACHINE IS IN OPERATION

BACKGROUND OF THE INVENTION

This invention relates to a method and apparatus for plunger replacement in a press molding machine for molding glass products and, more particularly, for CRT valves.

Hitherto, there has been known a molding machine of the type having a plurality of molding tools arranged in equally spaced relation in a peripheral area of a rotary table adapted to be rotated intermittently so that when the intermittently rotating table is not in rotation, glass products are press molded by a plurality of plungers (as disclosed in, for example, Japanese Patent Laid Open Publication Nos. 59-3024 and 60-137838).

According to this prior art arrangement, glass products can be molded with the one operation in same number as the number of plungers, but it is necessary for the plungers to be individually replaced due to damage (surface roughening) or the like caused on the surface of the plunger.

Where the glass products are the CRT valves, the portion of each product which is molded by a plunger surface is required to meet high surface and dimension standards consistent for use as an image forming surface. Therefore, once damage is caused to the surface of any of the plungers, the plunger must be replaced immediately.

Conventionally, in a molding machine equipped with a pluraltiy of plungers, it is necessary for the operation of the molding machine to be stopped each time for replacing even only one plunger.

With such a molding machine, one difficulty is that during the process of such a plunger replacement, normal plungers having no damage have to be put out of molding operation. Another difficulty is that during the process of such replacement, temperature drop is inevitable which results in changes in the condition of temperature distribution the change in temperature distribution condition being, the most critical condition of all pressing conditions involved. A change in temperature distribution condition results in further difficulty such that when operation is resumed, considerable time is required until proper condition of temperature distribution is restored, so that in the interim period, the operation results in continued production of defective goods.

This invention is directed to overcoming the above-mentioned difficulties, and accordingly, it is an object of the invention to provide a method for plunger replacement which can minimize possible drop in productivity during plunger replacement and wherein plunger replacement can be performed without any change being caused to the condition of temperature distribution with respect to normal plungers, and an apparatus for use in carrying out the method.

SUMMARY OF THE INVENTION

In order to accomplish the aforesaid object, the method in accordance with the invention is such that when the molding machine is in operation, at least one of the plungers is taken out from a pressing position to a plunger replacing position for replacement and, in the interim period, glass product molding is continued by using the rest of the plungers, the same procedure being followed for the replacement of the rest of the plungers.

The apparatus in accordance with the invention comprises a plurality of moving yokes for individually supporting ram mechanisms, each ram mechanism having a plunger removably mounted thereto, fixed yokes for individually and reciprocally supporting the moving yokes through a reciprocating mechanism between a pressing position and a plunger replacing position, locking mechanisms for individually locking the movable yokes to the fixed yokes at the pressing and plunger replacing positions, and positioning mechanisms for individually positioning the ram mechanisms at the pressing position.

The method of the invention can minimize possible drop in productivity during the process of plunger replacement because the plungers in normal condition are allowed to continue glass product molding operation in the meantime, and can also prevent changes in the condition of temperature distribution with the normal plungers.

The apparatus of the invention is so arranged that for the purpose of plunger replacement, molding operation of only the plunger requiring replacement is discontinued and the plunger requiring replacement is taken out to the plunger replacing position through the reciprocating mechanism. In this case, the movable yokes are locked by the locking mechanisms to the fixed yokes at the pressing and plunger replacing positions, and therefore the position of the plunger is always held constant during the process of replacement at the plunger replacing position and also when the plunger is returned to the pressing position.

At the pressing position, positioning of the ram mechanism is performed by the positioning mechanism; therefore, any off-center possibility during molding operation of the plunger can be prevented.

According to the plunger replacing method of the instant invention, it is possible to replace only the plunger requiring replacement while the molding machine is kept in operation, so that possible drop in productivity can be limited to a minimum. Further, during such a method, no adverse effect is caused to the molding conditions of the normal plungers and, therefore, production of defective goods can be reasonably reduced.

The apparatus for plunger replacement according to the invention is of such simple construction that, for individual plungers, there are provided ram mechanisms which are reciprocally movable by means of movable yokes. The method of the invention can be effectively carried out by employing such a simple arrangement. Another advantage is that the locking and positioning mechanisms permit accurate return to position of each plunger during and after the process of replacement.

DESCRIPTION OF THE PREFERRED EMBODIMENTS

Figure 1:
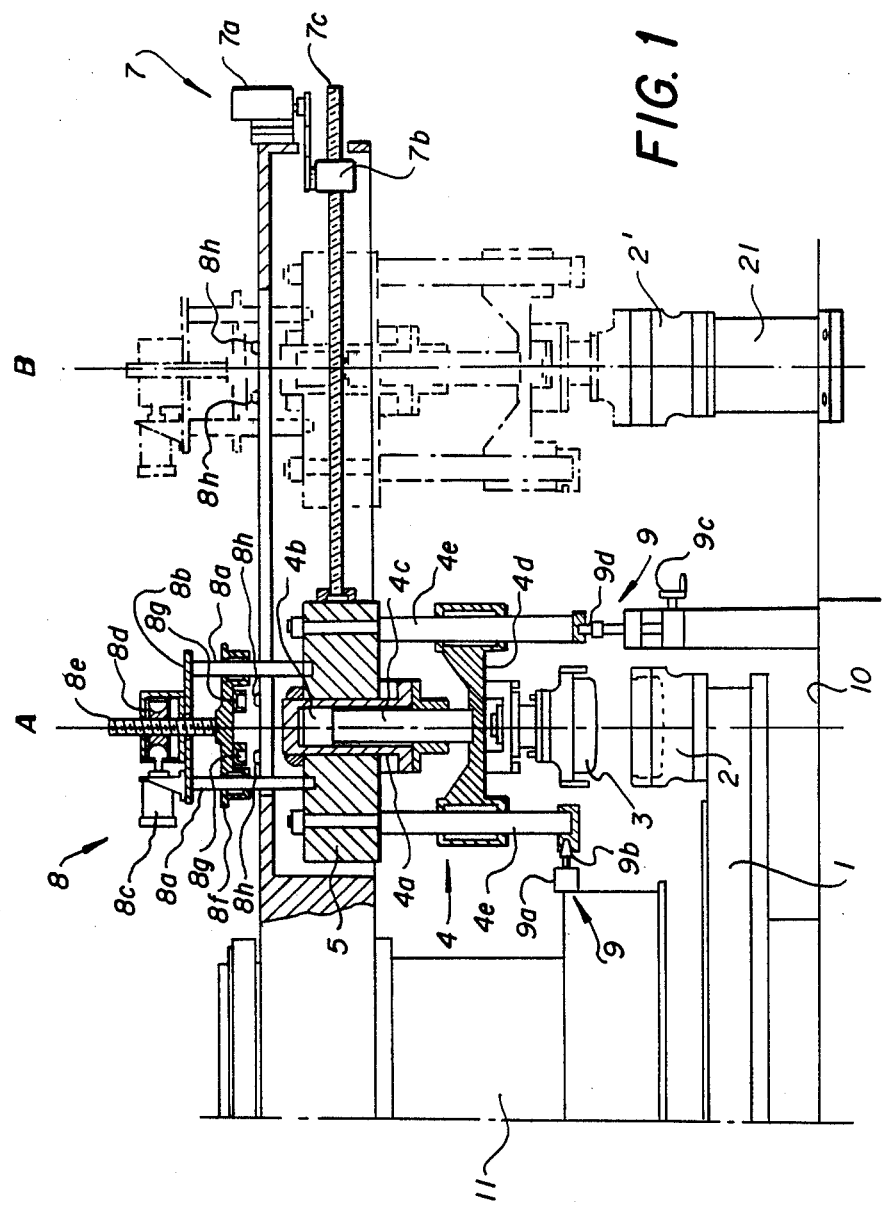
FIG. 1 is a schematic side view showing principal portions of one embodiment of the invention.

FIG. 1 is a schematic side view showing principal portions of one embodiment of the invention. In FIG. 1, numeral 1 designates a rotary table, reference number 2 designates a molding tool, reference number 3 designates a plunger, reference number 4 designates a ram mechanism, reference number 5 designates a movable yoke, reference number 6 designates a fixed yoke, reference number 7 designates a reciprocating mechanism, reference number 8 designates a locking mechanism, and reference number 9 designates a positioning mechanism.

The rotary table 1 is intermittently and rotatably supported on a vertically extending support shaft 11 mounted to a pressing machine body 10, and has a given number of molding tools 2 arranged in equally-spaced relation in its peripheral area.

Figure 2:
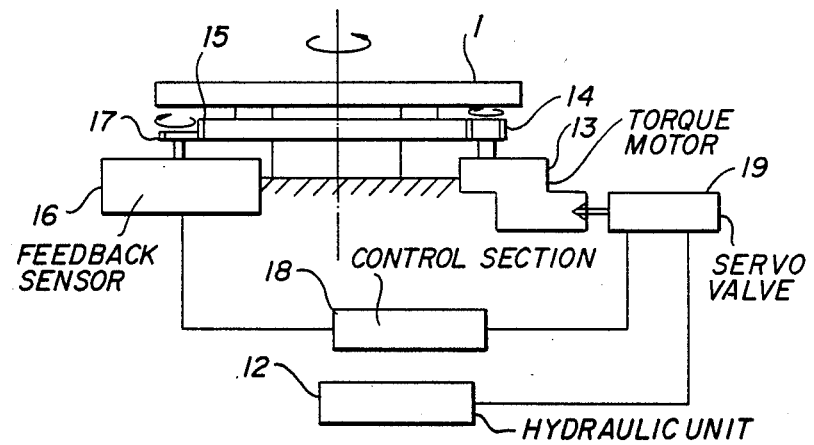
FIG. 2 is a block diagram showing, by way of an example, an intermittent drive mechanism of a rotary table.

As FIG. 2 shows, the rotary table 1 has a gear 15 which is in mesh engagement with an output gear 14 of a hydraulic torque motor 13 connected to a hydraulic unit 12, the gear 15 being in mesh engagement with a gear 17 of a sensor 16 so that the sensor 16 sends the movement of the rotary table 1 to a control unit 18 which, in turn, feeds back the movement to a servo mechanism 19. The servo mechanism 19 adjusts a deviation, if any, of the movement from a command signal. The servo mechanism 19 detects through the sensor 16 the condition of rotation of the rotary table 1 driven by the hydraulic motor 13, the detected condition being fed back for adjustment if there is any deviation from the command signal. Through this arrangement, it is possible to electrically preset stopping time, rotational speed, and/or acceleration with respect to the rotary table 1.

The intermittent rotation of the rotary table 1 is set so that two kinds of rotational movement, long and short, corresponding to an integral multiple of or a plurality of times the spaced interval of the molding tools 2 are alternately repeated. Similarly, the stopping time of the rotary table 1 in its intermittent rotation is set so that long and short times of stopping are alternately repeated, the long stopping time being allotted as time required for the supply of gob (molten glass) into the molding tools, while the long stopping time is alotted as the time required for press molding of glass products by the plungers 3.

The manner in which glass products are press molded by the molding tools 2 of the rotary table 1 will be explained by way of example with reference to FIGS. 3 and 4.

Figure 3:
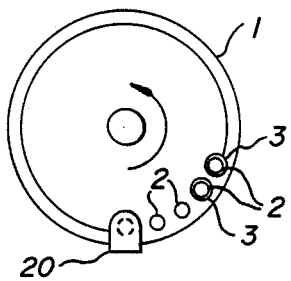
FIGS. 3 and 4 are schematic plan view showing, by way of examples, different arrangements of gob (molten glass) chutes and plungers in cases where two glass products are molded simultaneously.

FIG. 3 is an explanatory view showing by way of example the manner in which the intermittent rotation of the rotary table 1 is set so that two kinds of rotational movement, long and short, corresponding to an integral multiple of times the spaced pitch of the molding tools 2 are alternately repeated, in the case where two kinds of rotational movement, 1-pitch rotation and 3-pitch rotation, are alternately repeated by way of intermittent rotation in the direction of the arrow. In FIG. 3, reference numeral 20 designates a gob feeder, and reference numbers 3, 3 designate two plungers.

The gob feeder 20 is stationarily positioned as shown in FIG. 3 for supplying a predetermined quantity of gob to each molding tool 2 when the tool 2 reaches that position. By means of the intermittent rotating mechanism shown in FIG. 2 the rotary table 1 alternately repeats 1-pitch rotation and 3-pitch rotation with respect to the molding tools 2, thereby performing intermittent rotation.

The rotary table 1 rotates a distance of 3-pitch and then stops, whereupon press molding (initially with no load) is performed. Immediately prior to the end of the press molding the predetermined quantity of gob is fed into the corresponding molding tool 2, which supply is effected during a long stopping time. This stage of press molding is carried out for a long stopping time. After the long stopping time required for press molding, the rotary table 1 rotates one pitch, then stops. When the rotary table reaches a position right under the gob feeder 20, a next molding tool 2 is supplied with a predetermined quantity of gob. In this case, the stopping time is short. Thereafter, the rotary table 1 rotates 3-pitch again and enters a long stop. Meanwhile, two pieces of product are simultaneously press molded. Immediately before the end of the stopping time the predetermined quantity of gob is supplied to the molding tool 2 right under the gob feeder 20. Subsequently, the above steps of operation are repeated.

Figure 4:
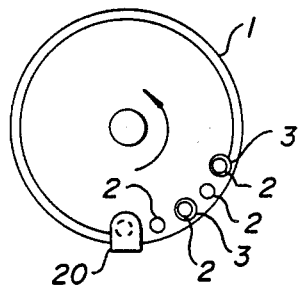

FIG. 4 illustrates a case in which the intermittent rotation of the rotary table 1 is set, for example, in such a way that alternate repetition of two kinds of rotation, long and short, corresponding to a plurality of times the spaced pitch of the molding tools 2 is carried out on a 2-pitch/2-pitch basis. In this case, the rotary shaft 1 rotates 2-pitch and then, a long stopping time follows. Meanwhile, two pieces of product are simultaneously press molded by the plungers 3, 3 (which operation is initially without load). Immediately before the end of the long stopping time, the predetermined quantity of gob is fed into the molding tool 2 right under the gob feeder 20. Then, the rotary table 1 rotates 2-pitch and a short-time stopping follows. Meanwhile, the molding tool 2 right under the gob feeder 20 is supplied with the predetermined quantity of gob. Again, the rotary table 1 moves 2-pitch, then a long-time stopping follows wherein two pieces of products are simultaneously press molded by the plungers 3, 3. Subsequently, the above noted process is repeated.

In the embodiment shown in FIG. 3, the plungers 3, 3 can be disposed adjacent to each other, while in the embodiment shown in FIG. 4, the plungers 3, 3; can be disposed away from each other.

In either case, molded glass products are cooled and then, mold separation and product removal follow. The process of from gob supply and up to product removal requires about one and a half turns of the rotary table. Again, reference is made to FIG. 1 with respect to the following description.

The ram mechanism 4 comprises a ram cylinder 4a, a ram piston 4b, a piston rod 4c, a bolster 4d, and a guide shaft 4e. The ram cylinder 4a and the guide shaft 4e are fixed to the movable yoke 5, and the ram piston 4b is adapted to be driven by high pressure fluid through a directional control electromagnetic valve (not shown) for upward and downward movement within the ram cylinder 4a. The directional control electromagnetic valve is operable both automatically and manually so that the ram mechanism is automatically controlled by means of the directional control electromagnetic valve in synchronism with the intermittent rotation of the rotary table, while the ram mechanism is manually controlled with the directional control electromagnetic valve during the plunger replacing operation.

Each plunger 3 is removably mounted to the bolster 4d. In the embodiments illustrated in FIGS. 3 and 4, the two plungers 3, 3 are separately mounted to the ram mechanism 4.

The movable yokes 5 are individually supported by the fixed yokes 6 through the reciprocating mechanism 7 for reciprocal movement between the pressing position A and the plunger replacing position B.

Each fixed yoke 6 is fixed to an upper portion of the support shaft 11 of the pressing machine body 10.

The reciprocating mechanism 7 comprises a motor 7a fixed to the fixed yoke 6, a nut 7b supported on the fixed yoke 6 so as to be driven by the motor 7a for rotation in position, and a feed screw 7c which is in thread engagement with the nut 7b and connected therethrough to the movable yoke 5.

The locking mechanism 8 comprises a motor 8c mounted through a base plate 8b on top of a plurality of upwardly extending guide supports 8a mounted on the top end of the movable yoke 5, and a nut 8d supported on the base plate 8b so as to be driven by the motor 8c for rotation in position. The locking mechanism 8 further comprises a screw shaft 8e held in thread engagement with the nut 8d, and a locking plate 8f connected to the screw shaft 8e and is upwardly and downwardly movable along the guide supports 8a. The locking mechanism 8 further includes lock pins 8h mounted on the fixed yokes 6 at the pressing position A and at the plunger replacing positions B, the lock pins 8h matching locking holes 8g bored in the locking plate 8f.

The positioning mechanism 9 is installed on a non-moving portion of the pressing machine body 10 for positioning the lower end of the guide shaft 4e of the ram mechanism 4 and comprises a positioning pin 9b provided on the radically inner side of the rotary table 1 and movable into and away from a positioning hole of the guide shaft 4e through a cylinder 9a. The positioning mechanism 9 further include a positioning pin 9d provided on the radially outer side of the rotary table 1 and movable into and away from a positioning hole of the guide shaft 4e through a manual handle 9c.

At the plunger replacing position B, there is provided a common or separate mold replacing truck 21 on which a molding tool 2', identical to the molding tool 2, is disposed. Next, the manner of operation for the replacement of plunger 3 is hereinafter described.

The molding operation of the plunger 3 to be replaced is first stopped, and the operation is switched over to manual operation.

Then, the positioning pin 9d is lowered by means of the manual handle 9c for withdrawal from the positioning hole. The cylinder 9a cooperates with this operation to remove the positioning pin 9b from the positioning hole of the guide shaft 4e.

Subsequently, the motor 8c of the locking mechanism 8 is driven to move the locking plate 8f upward through the thread engagement relation between the nut 8d and the screw shaft 8e, the locking plate 8f being thereby removed from the locking pin 8h for unlocking. Thereupon, the ram mechanism, including the movable yoke 5, mounts on the slide portion (slide bearing) of the fixing yoke 6 under its own weight, though not shown in FIG. 1.

Next, the motor 7a of the reciprocating mechanism 7 is driven to shift the movable yoke 5 to the plunger for replacing position B through the thread engagement relation between the nut 7b and the feed screw 7c. At this position, the lock plate 8f is lowered by the motor 8c of the locking mechanism 8 through the thread engagement relation between the nut 8d and the screw shaft 8e, the locking pin 8h on the locking plate 8f being then brought in engagement with the locking hole for locking. Further, as the motor 8c rotates in the same direction, the plunger 3, ram mechanism 4, and the movable yoke 5 mount on the fixed yoke 6 through the locking plate 8f, so that the load of the slide bearing between the fixed yoke 6 and the movable yoke 5 is removed, the upper surface of the movable yoke 5 being thus brought in contact with the underside of the fixed yoke 6, whereupon the motor 8c stops. In this, manner, immediately under the ram mechanism 4, the mold replacing truck 21 is set in position. Molding tool 2' is mounted on the mold replacing truck 21 in concentric relation with the ram mechanism 4. In this condition, the ram piston 4b is manually lowered to pull out the plunger 3 which is then mounted on the molding tool 2' on the mold replacing truck 21. The plunger 3 is removed from the bolster 4d and then, the bolster 4d is elevated through the ram piston 4b. The plunger 3 which is thus removed is then transported onto the mole replacing truck 21, being then transported outward by means a crane or otherwise. A new plunger 3 is set on the molding tool 2' and moved to a location right under the bolster 4d. The bolster 4d is lowered through the ram piston 4b for mounting the new plunger 3 on the bolster 4d. After mounting, the ram piston 4b is elevated and subsequently, the motor 8c of the locking mechanism 8 is driven to move the movable yoke 5 to the pressing position A, in which case the motor 8c of the locking mechanism 8 is driven for locking and also for removal of the load of the slide bearing. Then, the ram mechanism 4 positions the guide shaft 4e of the ram mechanism 4. The ram mechanism 4 is reset for automatic operation for the molding of glass products.

During the above described process of replacing the plunger 3, glass product molding operation by another plunger 3 is continuous. In the meantime, supply of gob to the molding tool corresponding to the plunger under replacement is cut by a cullet chute.

In the above described embodiment, two plungers are employed for simultaneously molding two pieces of glass product. However, the invention can be equally applied where more than two plungers are employed.

While the invention has been particularly shown and described in reference to preferred embodiments thereof, it will be understood by those skilled in the art that changes in form and details may be made therein without departing from the spirit and scope of the invention.

What is claimed is:

1. A molding machine of a type having a plurality of molding tools arranged in equally spaced relation in a peripheral area of a rotary table adapted to be rotated intermittently so that while the intermittently rotating table is not in rotation, glass products are press molded by plungers, the molding machine comprising:

a plurality of ram devices, each said ram device having a plunger removably mounted thereto;

a plurality of movable yokes each for individually supporting one of said ram devices;

a plurality of fixed yokes provided on the rotary table and each for individually reciprocably supporting one of the movable yokes, each said fixed yoke having a reciprocating means for moving said supported movable yoke and ram device between a pressing position above the molding tool and a plunger replacing position a location spaced therefrom;

a plurality of locking means each for individually lockng the supported movable yoke to the fixed yoke at the pressing position and the plunger replacing position; and a plurality of positioning means each for individually positioning the supported ram device at the pressing position.

2. The molding machine of claim 1, wherein each of said positioning means comprises a vertical positioning device and a horizontal positioning device.

3. A molding machine of a type having a plurality of molding tools arranged in equally spaced relation in a peripheral area of a rotary table adapted to be rotated intermittently so that while the intermittently rotating table is not in rotation, glass products are press molded by plungers, the molding machine comprising:

a plurality of movable yokes provided at a circular periphery of the rotary table;

a plurality of plungers, each of said plungers being operably coupled to one of said movable yokes;

a reciprocating means for moving each movable yoke between a first position above one of the molding tools and a second position spaced therefrom; and a plurality of locking means, each of said locking means individually locking one of the movable yokes at the first position and the second position.

* * * * *